US011410633B2

(12) United States Patent
Chen

(10) Patent No.: US 11,410,633 B2
(45) Date of Patent: Aug. 9, 2022

(54) ORIENTATION SELECTION

(71) Applicant: VERIZON PATENT AND LICENSING INC., Basking Ridge, NJ (US)

(72) Inventor: Chien-Hung Zordius Chen, Taipei (TW)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 632 days.

(21) Appl. No.: 14/941,924

(22) Filed: Nov. 16, 2015

(65) Prior Publication Data

US 2017/0140738 A1    May 18, 2017

(51) Int. Cl.
| G09G 5/00 | (2006.01) |
| G09G 5/38 | (2006.01) |
| G06F 3/01 | (2006.01) |
| G06F 3/04845 | (2022.01) |
| G06F 1/16 | (2006.01) |
| G06T 3/40 | (2006.01) |
| G06T 3/00 | (2006.01) |

(Continued)

(52) U.S. Cl.
CPC ............. *G09G 5/38* (2013.01); *G06F 1/1694* (2013.01); *G06F 3/012* (2013.01); *G06F 3/04845* (2013.01); *G06T 3/0006* (2013.01); *G06T 3/40* (2013.01); *G06T 3/60* (2013.01); *G06V 40/172* (2022.01); *G06F 2203/04803* (2013.01); *G09G 2320/028* (2013.01); *G09G 2320/068* (2013.01); *G09G 2340/0492* (2013.01); *G09G 2360/144* (2013.01)

(58) Field of Classification Search
CPC ................. G06T 3/60; G06T 2219/024; G06T 2200/24; G06T 2219/2004; G06T 2219/2016
See application file for complete search history.

(56) References Cited

U.S. PATENT DOCUMENTS

2009/0322690 A1* 12/2009 Hiltunen ............... G06F 1/1649
345/173
2011/0064281 A1*  3/2011 Chan ..................... G06Q 50/01
382/118

(Continued)

OTHER PUBLICATIONS

Cheng, et al., "iRotate: Automatic Screen Rotation based on Face Orientation", May 5-10, 2012, pp. 1-8, http://citeseerx.ist.psu.edu/viewdoc/summary?doi=10.1.1.360.1612.

Alan F., Samsung GALAXY Note II offers "Smart Rotation", Oct. 2, 2012, pp. 1-6, http://www.phonearena.com/news/Samsung-GALAXY-Note-II-offers-Smart-Rotation_id35118.

(Continued)

*Primary Examiner* — Weiming He

(57) ABSTRACT

Among other things, one or more client devices, techniques, and/or systems are provided for orientation selection. A first user and a second user are detected within a range of a detection component, such as a camera, of a client device. A position of a face of the first user is identified relative to a screen of the client device (e.g., near a right side). A second position of a second face of the second user is identified relative to the screen (e.g., near a left side). An element of an application, displayed by the client device, is presented in a first orientation (e.g., a landscape orientation facing to the right side) based upon the position of the face and a second element of the application is presented in a second orientation (e.g., the landscape orientation facing to the left side) based upon the second position of the second face.

20 Claims, 11 Drawing Sheets

(51) Int. Cl.
*G06T 3/60* (2006.01)
*G06V 40/16* (2022.01)

(56) References Cited

U.S. PATENT DOCUMENTS

| | | | | |
|---|---|---|---|---|
| 2013/0257291 | A1* | 10/2013 | Tabor | H05B 37/0218 315/152 |
| 2013/0300671 | A1* | 11/2013 | Hallerstrom Sjostedt et al. | G06F 1/1626 345/173 |
| 2014/0037155 | A1* | 2/2014 | Faria | H04L 9/3231 382/118 |
| 2015/0102995 | A1* | 4/2015 | Shen | G06F 3/013 345/156 |
| 2016/0073010 | A1* | 3/2016 | Cronin | G06Q 10/00 705/39 |
| 2016/0274733 | A1* | 9/2016 | Hasegawa | G06F 3/048 |
| 2017/0032349 | A1* | 2/2017 | Nishida | G06Q 30/06 |

OTHER PUBLICATIONS

Whitney, Lance, "Samsung, LG may battle over eyetracking technology", Mar. 19, 2013, pp. 1-3, http://www.cnet.com/news/samsung-lg-may-battle-over-eye-tracking-technology/.
Supporting Multiple Interface Orientations, Sep. 18, 2015, pp. 1-7, https://developer.apple.com/library/ios/featuredarticles/ViewControllerPGforiPhoneOS/RespondingtoDeviceOrientationChanges/RespondingtoDeviceOrientationChanges.html.
"View Controller Programming Guide for iOS", Dec. 13, 2012, pp. 1-126, https://developer.apple.com/library/ios/featuredarticles/ViewControllerPGforiPhoneOS/RespondingtoDeviceOrientationChanges/RespondingtoDeviceOrientationChanges.html.
https://www.youtube.com/watch?v=cnyN6P7nBOM, Feb. 20, 2012.
https://www.youtube.com/watch?v=OvrissSCv-s, Oct. 22, 2007.
https://www.youtube.com/watch?v=hRzHkKwuctA, Nov. 18, 2012.

* cited by examiner

ORIENTATION SELECTION

BACKGROUND

Multiple users may desire to engage with an application on a client device, such as for collaborative or sharing purposes. However, user interface elements of the application may be displayed in a static orientation (e.g., a static landscape or portrait orientation), such that one user may easily view the application while another user may have difficulty viewing the application because the user interface elements are oriented towards the user. For example, a first user and a second user may be playing a game on the client device. However, user interface elements of the game may be presented in a first orientation that is easily visible to the first user but not the second user (e.g., text may be displayed such that the first user can read the text but where the text is upside down for the second user). Unfortunately, the client device may not dynamically present individual user interface elements in different orientations that correspond to dynamic view perspectives of different users.

SUMMARY

In accordance with the present disclosure, one or more client devices, systems, and/or methods for orientation selection are provided. In an example, a first user, a second user, and/or additional users within a range of a detection component of a client device may be detected (e.g., a camera may be used to identify users engaging with the client device). A position of a face of the first user, a second position of a second face of the second user, and/or positions of faces of additional users may be identified relative to a screen of the client device (e.g., a position of a face may be identified based upon imagery captured of the face by the camera; gaze tracking; etc.). An identity of the first user may be identified based upon the face of the first user. A second identity of the second user may be identified based upon the second face of the second user. An element (e.g., text, instructions, an image, a video, a user interface element, audio visual content, etc.), of an application, may be displayed by the client device in a first orientation based upon the position of the face. A second element, of the application, may be presented in a second orientation based upon the second position of the second face.

In an example, the identity of the first user and/or the second identity of the second user may be identified utilizing facial recognition, voice recognition, user input, and/or a variety of other techniques. Information may be presented in the first orientation based upon the identity of the first user, and second information may be presented in the second orientation based upon the second identity of the second user. For example, responsive to the first user being identified as an airplane navigator and the second user being identified as a pilot, navigational information text may be displayed such that the first user can read the navigational information text and aeronautical information text may be displayed such that the second user can read the aeronautical information text. In another example, a role (e.g., a job, a field, a title, a specialty, etc. of the first user) may be identified utilizing a symbol (e.g., a badge, an identification card, a rank insignia, etc.) associated with the first user. In an example, a second role of the second user may be identified utilizing a second symbol associated with the second user. Role information (e.g., the navigational information text) may be presented to the first user in the first orientation based upon the role of the first user. Second role information (e.g., the aeronautical information text) may be presented in the second orientation based upon the second role of the second user.

In an example, a distance of the first user and/or a second distance of the second user from the client device may be identified. The element, such as the navigational information text, may be presented to the first user in a first size based upon the distance. The second element, such as the aeronautical information text, may be presented to the second user in a second size based upon the second distance. In an example, detected light, motion, and/or other signals may be used to determine whether to activate or deactivate the detection component in order to improve battery consumption of the client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
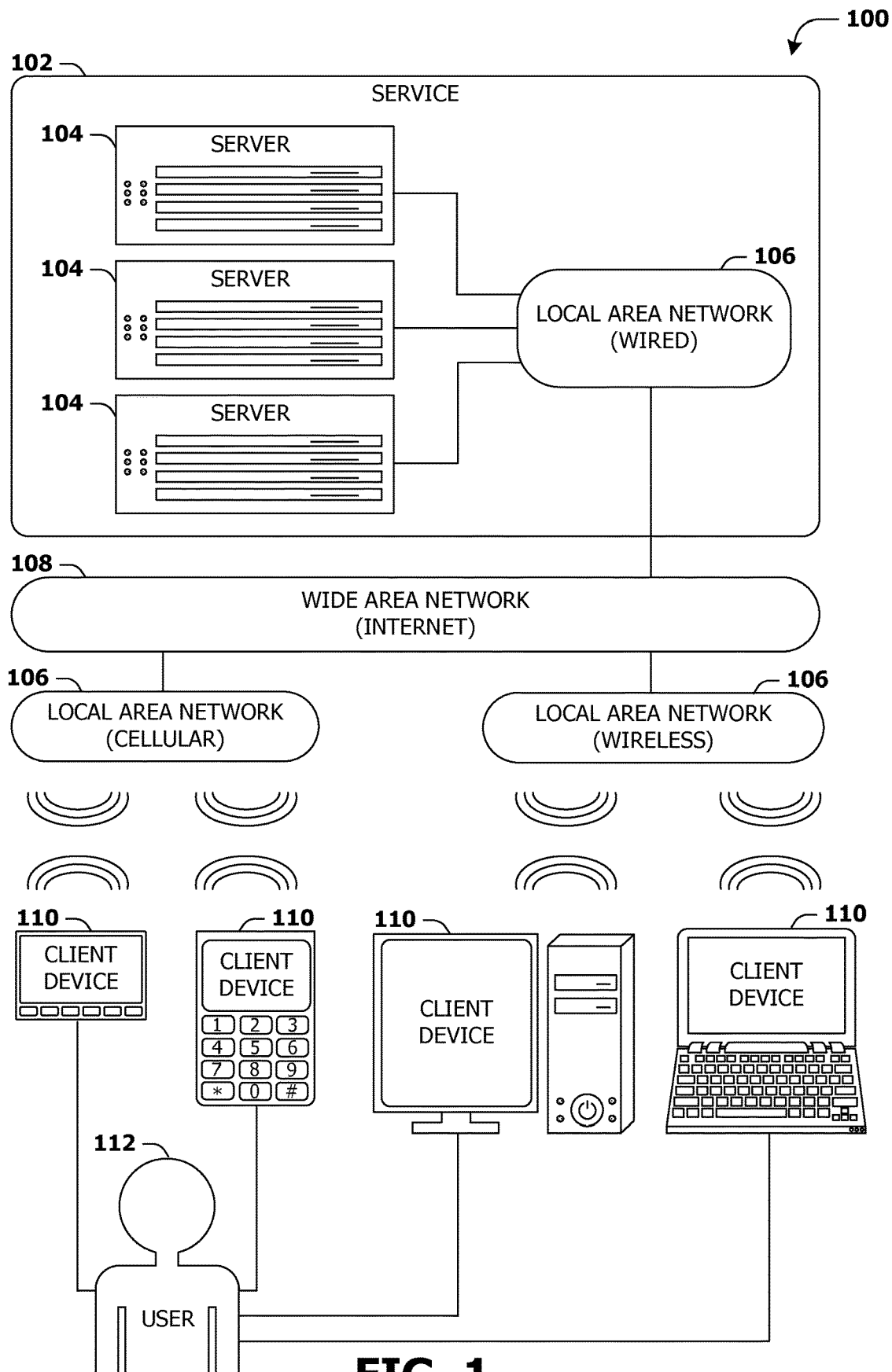
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
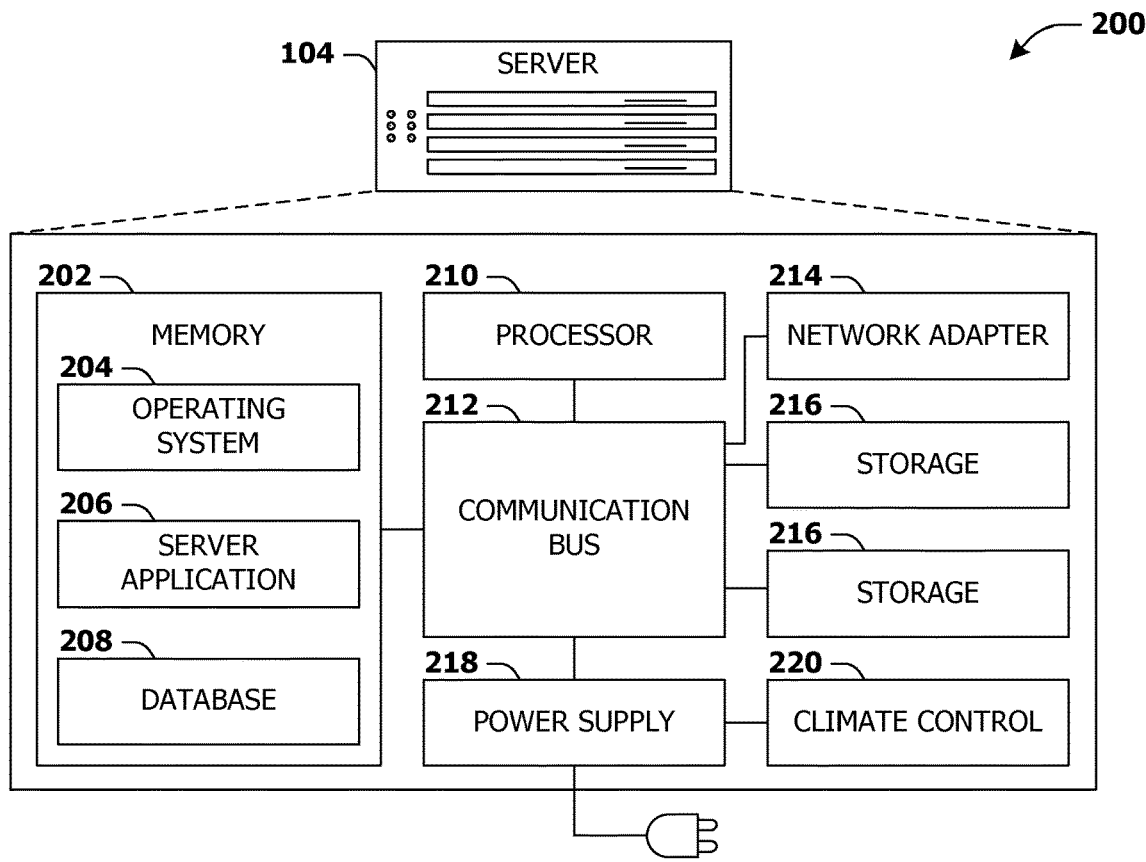
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
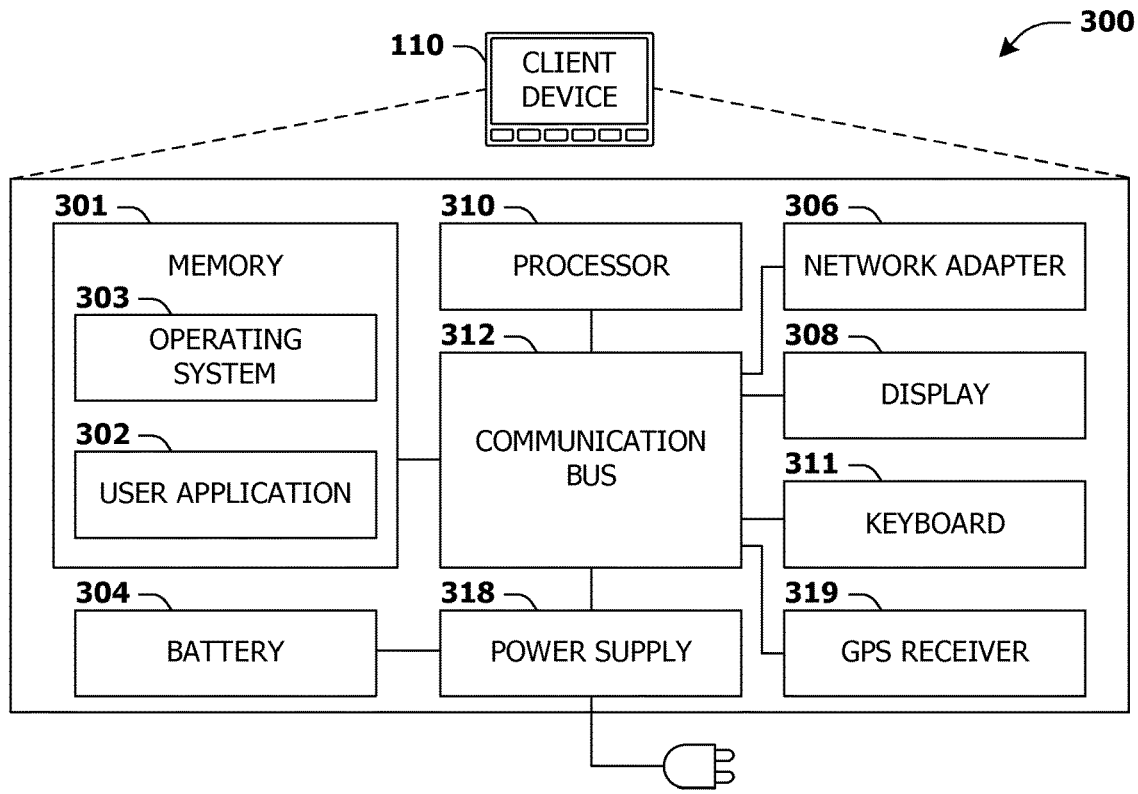
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for orientation selection are provided. Responsive to a first user, a second user, and/or additional users of a client device (e.g., a smart phone, a tablet, etc.) entering a detection range of the client device, a position of a face of the first user (e.g., a position based upon recognizing eye, mouth, nose, and/or other facial features), a second position of a second face of the second user, and/or additional positions of additional faces of the additional users may be identified. For example, if the client device is on a flat surface, then the first user may be positioned on a right side of a screen of the client device and the second user may be positioned on a left side of the screen. An element (e.g., a user interface element comprising a textual instruction), of an application (e.g., a math game) hosted on the client device, may be presented to the first user in a first orientation based upon the position of the face (e.g., the element may be oriented to the right side of the screen). A second element (e.g., a second user interface element comprising a current score for the game), of the application may be presented to the second user in a second orientation based upon the second position of the second face (e.g., the second element may be oriented to the left side of the screen). Additional elements of the application may be presented to the additional users in additional orientations based upon the additional positions of the additional faces. Facial recognition may be utilized to identify an identity of the first user (e.g., Tom Jones), a second identity of the second user (e.g., Jerry Jones), and/or additional identities of the additional users. A symbol (e.g., a badge, an identification card, etc.) associated with the first user, the second user, and/or the additional users may be identified and utilized to identify a role (e.g., a job) of the first user (e.g., a teacher), a second role of the second user (e.g., a student), and/or additional roles of the additional users. Information relevant to the identity and/or role of the first user (e.g., an equation input interface) may be presented in the first orientation, and second information relevant to the second identity and/or second role of the second user (e.g., a math problem solving interface) may be presented in the second orientation.

The ability to dynamically orient individual user interface elements of an application based upon positions of users relative to the client device may allow multiple users to efficiently interact with the client device. For example, if the users are playing the math game on the client device, then displaying user interface elements of the math game in orientations corresponding to view perspectives of individual users to whom such user interface elements are relevant may allow multiple users to easily play the math game without reorienting the client device between turns. Additionally, presenting information, relevant to the first user based upon identifying the first role and/or identity of the first user, in an orientation more easily interpreted by the first user may increase an efficiency of information presentation and ease of viewing. Power consumption of the client device may be improved by transitioning a detection component, such as a camera used to detect users, a screen, and/or other hardware of the client device into a lower powered state based upon a determination that no users are interacting with the client device.

Figure 4:
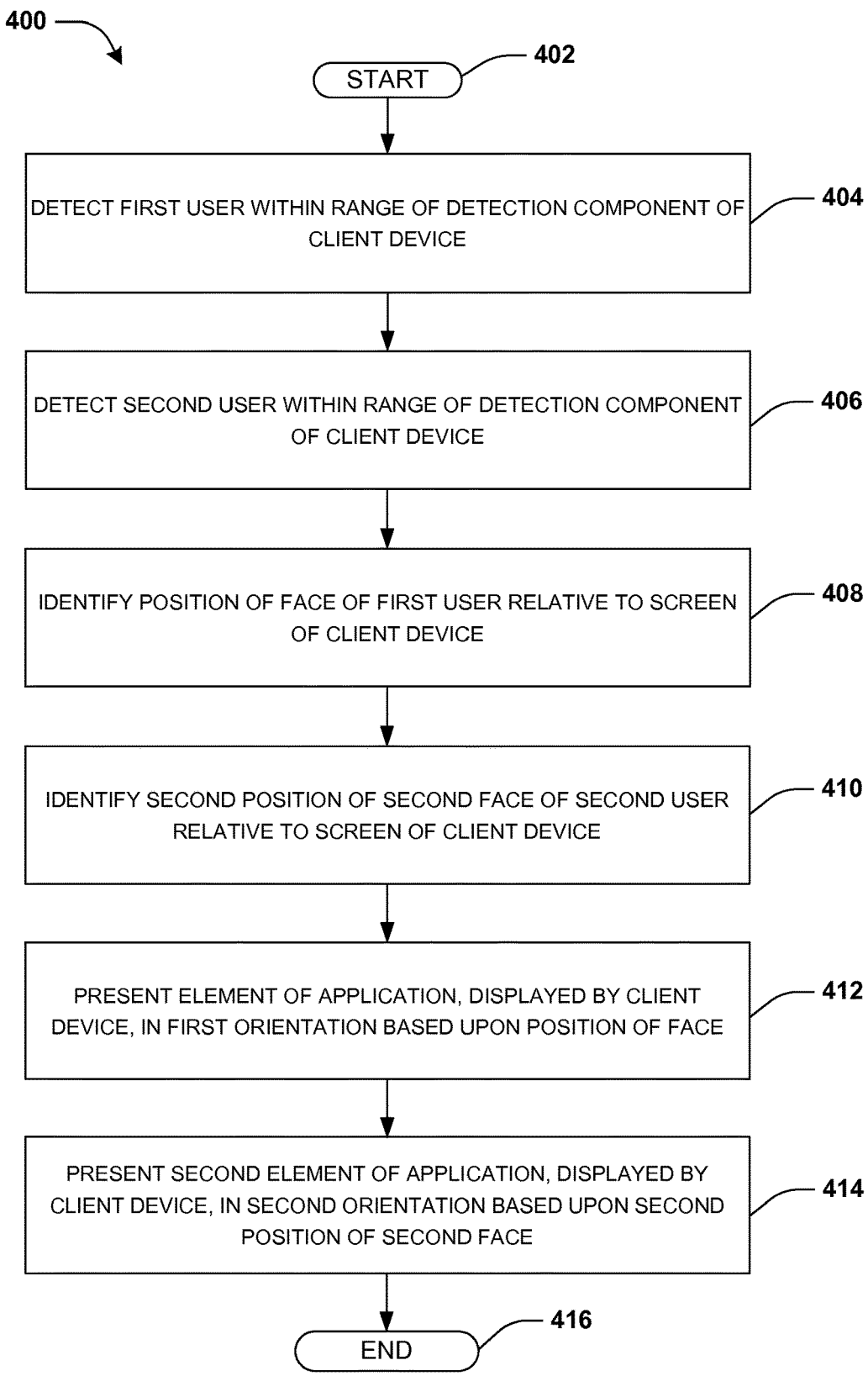
FIG. 4 is a flow chart illustrating an example method of orientation selection.

An embodiment of orientation selection is illustrated by an example method 400 of FIG. 4. At 402, the method 400 starts. At 404, a first user, of a client device, may be detected as being within range of a detection component (e.g., a camera) of the client device. A distance of the first user to the client device may be determined. In an example, the detection component may be activated responsive to a light sensor, of the client device, detecting a light outside a consistency range (e.g., a light intensity of the light may be altered, thus indicating a presence of a user or the client device being held/moved). The detection component may be deactivated responsive to the light intensity of the light being within the consistency range for the light duration threshold (e.g., the light intensity is not altered for 5 minutes or some other duration, which may indicate that the client device is sitting on a table not being used). In another example, the detection component may be activated responsive to a motion sensor, a gyroscope, a global positioning system (GPS), a magnetic sensor, and/or any other type of sensor of the client device detecting motion of the client device. The detection component may be deactivated responsive to the client device remaining at rest without motion indicative of user interaction for a stability duration threshold (e.g., 5 minutes or some other duration). Deactivating the detection component when the client device is not in use may reduce power consumption of the client device.

At 406, a second user, of the client device, may be detected within range of the detection component of the client device. A second distance of the second user to the client device may be determined. At 408, a position of a face of the first user may be identified relative to a screen of the client device. The face may be identified by identifying the first user's eyes, nose, and/or mouth position. Facial recognition may be utilized to identify an identity (e.g., John Jones) of the first user. In an example, John Jones may specify an interest, such as a preferred character of a game on the client device, which may be used to customize the game upon recognizing John Jones. In an example, the detection component may detect a symbol (e.g., a badge) associated with the first user, which may be used to identify the first user.

At 410, a second position of a second face of the second user may be identified relative to the screen. The second face may be identified by identifying the second user's eyes, nose, and/or mouth position. Facial recognition may be utilized to identify a second identity (e.g., Marie Johns) of the second user. In an example, Marie Johns may have specified an interest, such as a second preferred character of the game on the client device. In an example, the detection component may detect a second symbol (e.g., a second badge) associated with the second user, which may be used to identify the second user.

At 412, an element of an application (e.g., a game user interface) may be displayed, on the client device, in a first orientation based upon the position of the face. In an example, the element may comprise text, instructions, an image, a user interface element, a video, audio visual content, etc. For example, if the first user is positioned on a right side of the client device, then the element may be oriented in a landscape orientation facing the right side of the client device. In an example, the element may comprise information based upon the identity of the first user (e.g., information relating to a game character controlled by the first user). For example where the first user was identified as John Jones playing the game, the information may correspond to John Jones' preferred character. In another example, the element may comprise information based upon the first user's role (e.g., the first user's position within the game). For example, responsive to the symbol comprising an insignia related to the game (e.g., a rank within the game), the information may comprise information about the rank and/or one or more characters having the rank within the game.

At 414, a second element of the application may be displayed in a second orientation based upon the second position of the second face. For example, if the second user is positioned on a left side of the client device, then the second element may be oriented in the landscape orientation facing the left side of the client device. In an example, the second element may comprise second information based upon the second identity of the second user. For example where the first user was identified as Marie Johns playing the game, the second information may correspond to Marie Johns' preferred character. In another example, the second element may comprise second information based upon the second user's role. For example, responsive to the second symbol comprising a badge related to a character in the game (e.g., Marie Johns' avatar), the second information may comprise information about the avatar.

In an example, a third element of the application may be displayed in a third orientation based upon a third position of a third face of a third user, the third user's role, and/or the third user's identity (e.g., Marvin Hamish). A fourth element of the application may be displayed in a fourth orientation based upon a fourth position of a fourth face of a fourth user, the fourth user's role, and/or the fourth user's identity (e.g., Taylor Perry). For example, the first user, the second user, the third user, and the fourth user may play a four person racing game, where various elements are presented in various orientations corresponding to positions, roles, and/or identities of the respective users.

In an example, a distance of the first user from the client device may be determined. A size of the element may be altered to comprise a first size based upon the distance. For example, if the first user is farther away from the client device, then the first size may be larger as compared to the first size where the first user is closer to the client device. In an example, a second size of the second element may be altered based upon a second distance of the second user from the client device. At 416, the method 400 ends.

Figure 5:
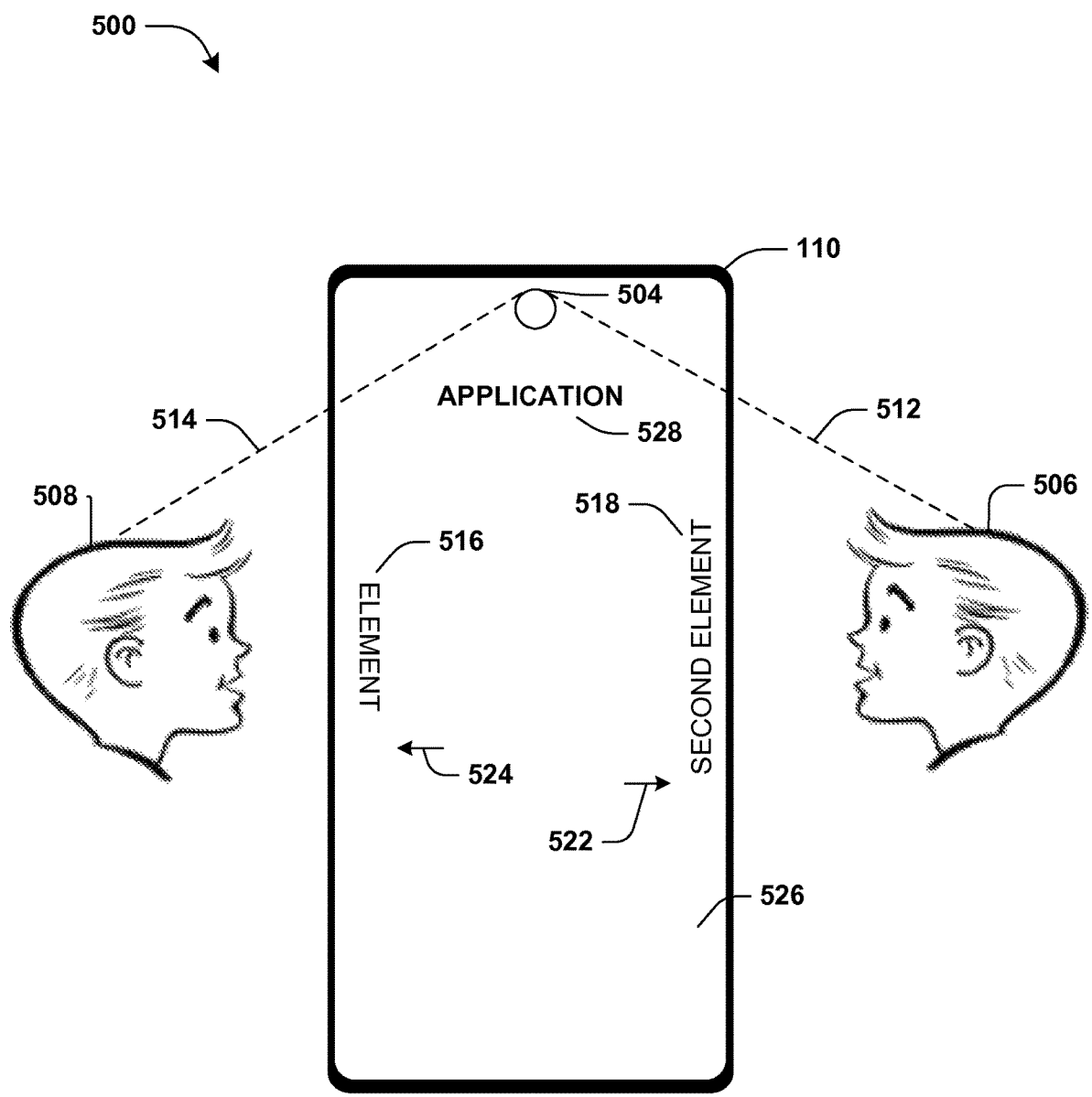
FIG. 5 is a component block diagram illustrating an example system for orientation selection, where an element in a first orientation is presented to a first user of a client device and a second element in a second orientation is presented to a second user of the client device.

FIG. 5 illustrates an example system 500 for orientation selection. A first user 508 and a second user 506 of a client device 110 may be detected by a detection component 504 (e.g., a front facing camera). A position 514 of a face of the first user 508 may be identified relative to a screen 526 of the client device 110. A second position 512 of a second face of the second user 506 may be identified relative to the screen 526. An element 516 of an application 528, displayed on the client device 110, may be dynamically displayed in a first orientation 524 (e.g., a landscape orientation facing a right side of the client device 110) based upon the position 514 of the face. A second element 518 of the application 528 may be displayed in a second orientation 522 (e.g., the landscape orientation facing a left side of the client device 110) based upon the second position 512 of the second face. In an example, the element 516 may be dynamically reoriented, positioned, and/or sized based upon a change in position of the face of the first user 508 and/or the second element 518 may be dynamically reoriented, positioned, and/or sized based upon a change in position of the second face of the second user 506.

Figure 6A:
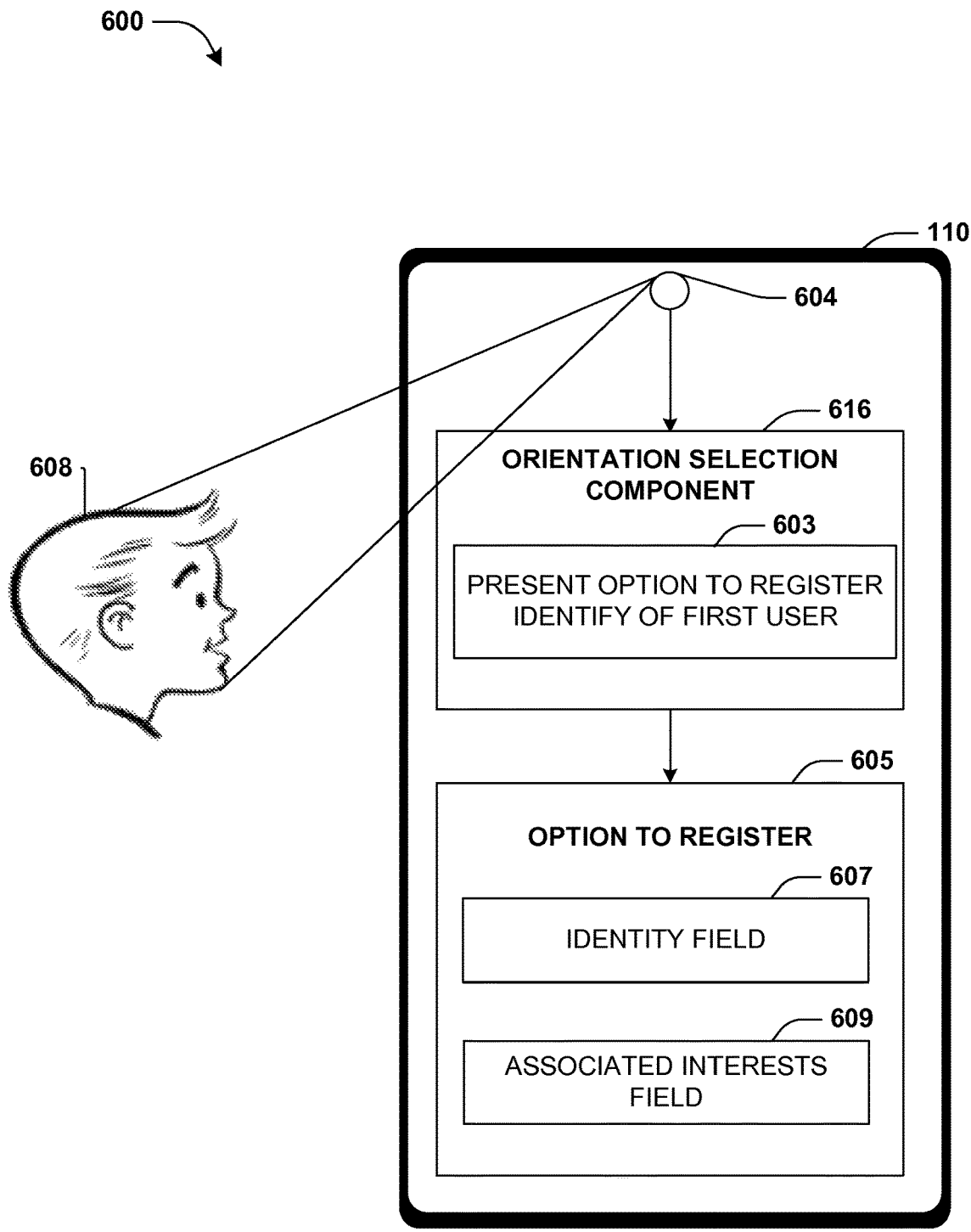
FIG. 6A is a component block diagram illustrating an example system for orientation selection, where an identity of a first user is registered.
Figure 6B:
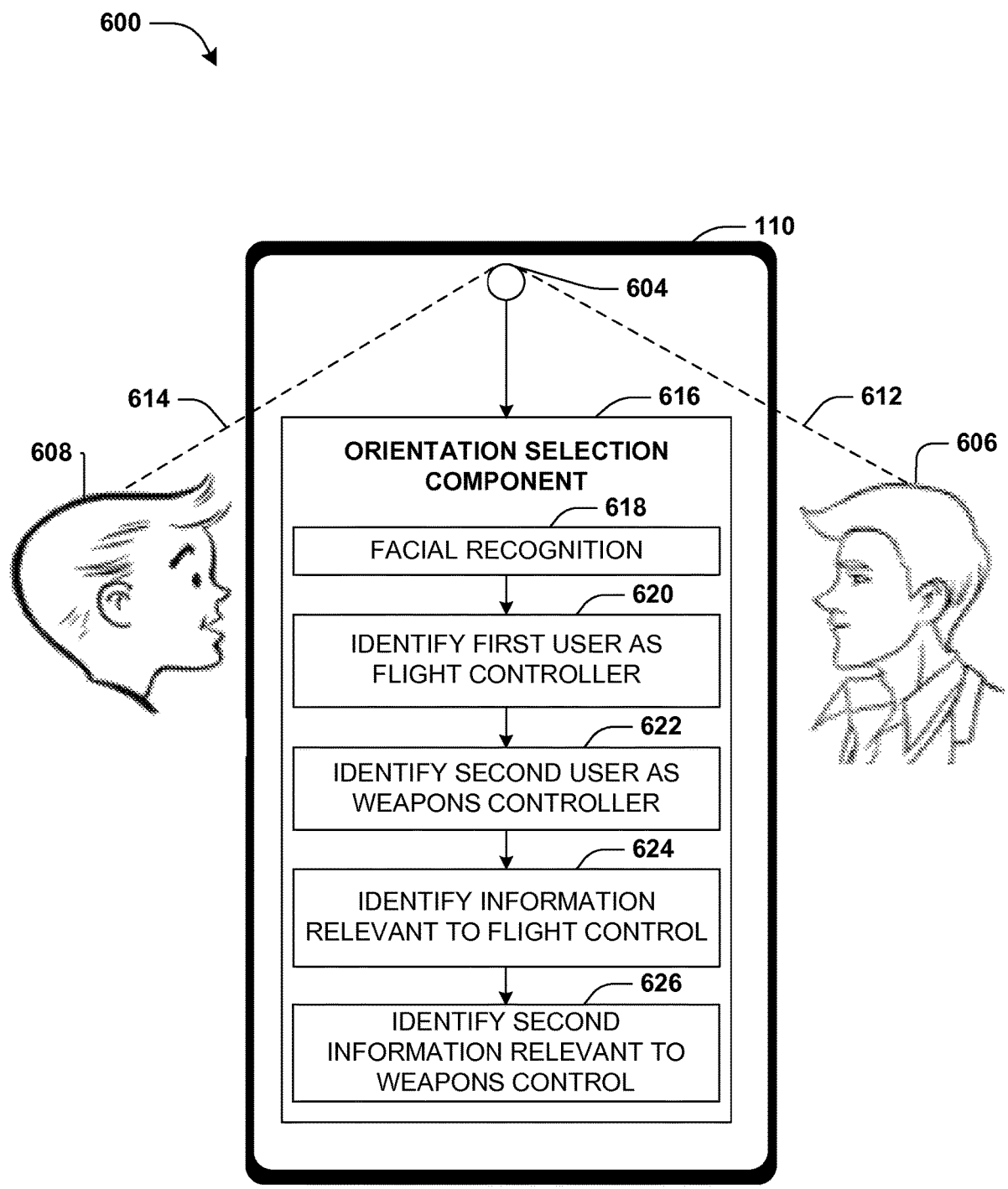
FIG. 6B is a component block diagram illustrating an example system for orientation selection, where an identity of a first user and a second identity of a second user are identified utilizing facial recognition.
Figure 6C:
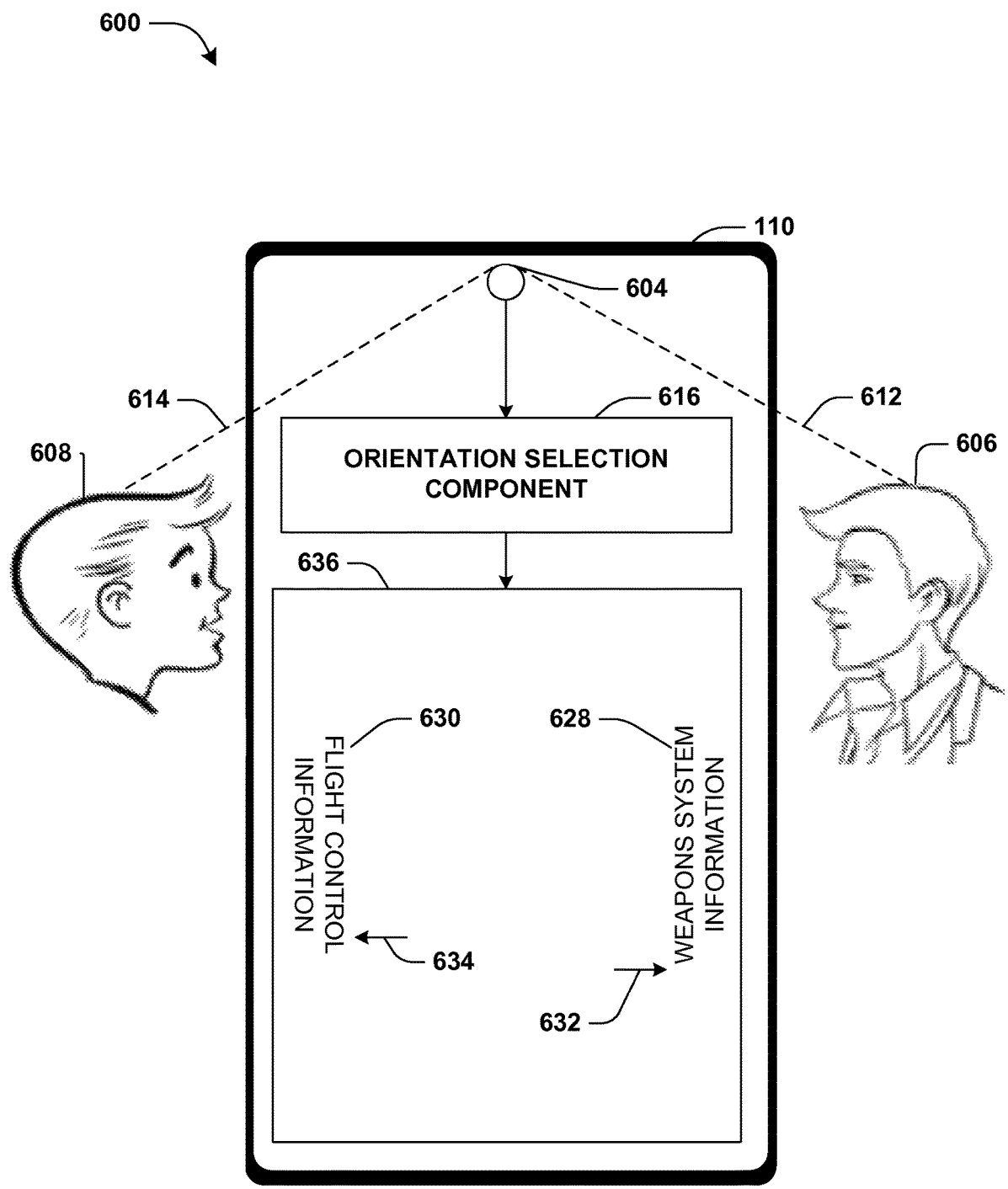
FIG. 6C is a component block diagram illustrating an example system for orientation selection, where information is presented in a first orientation to a first user of a client device and second information is presented in a second orientation to a second user of the client device.

FIGS. 6A-6C illustrate an example system 600 for orientation selection comprising an orientation selection component 616. A first user 608 of a client device 110 may be detected by a detection component 604 of the client device 110. An image of a face of the first user 608 may be captured by the detection component 604. The orientation selection component 616 may present 603 an option to register 605 an identity of the first user 608 utilizing the image captured of the first user 608. The option to register 605 may comprise an identity field 607 (e.g., where the first user 608 may enter the first user's name) and an associated interests field 609 (e.g., where the first user may enter the first user's role, interests, a link to an associated profile, etc.). For example, the user may enter the name Mary Hobbs, and link her name to a role corresponding to a job role of being a flight controller 620 for one or more airplanes. In an example, a second identity of a second user 606 and second associated interests may be registered. In an example, facial recognition may identify identities of one or more users (e.g., the first user, the second user, etc.) from social media, search websites, etc., and information about the one or more users may be obtained from user profiles, blogs, etc. of the one or more users.

FIG. 6B illustrates the example system 600 identifying the identity of the first user 608 and the second identity of the second user 606 utilizing facial recognition 618. The orientation selection component 616 may identify a position 614 of a face of the first user 608 and a second position 612 of a second face of the second user 606. The first user 608 may be identified as the flight controller 620, and the second user 606 may be identified as a weapons controller 622. The orientation selection component 616 may identify information 624 relevant to flight control and second information 626 relevant to weapons control based upon the identity and second identity.

FIG. 6C illustrates the orientation selection component 616 presenting flight control information 630, based upon the identity of the first user 608 (e.g., as the flight controller), to the first user 608 in a first orientation 634 based upon the position 614 of the face of the first user 608. The orientation selection component 616 may present weapons system information 628, based upon the second identity of the second user 606 (e.g., as the weapons controller), to the second user 606 in the second orientation 632 based upon the second position 612 of the second face of the second user 606.

Figure 7A:
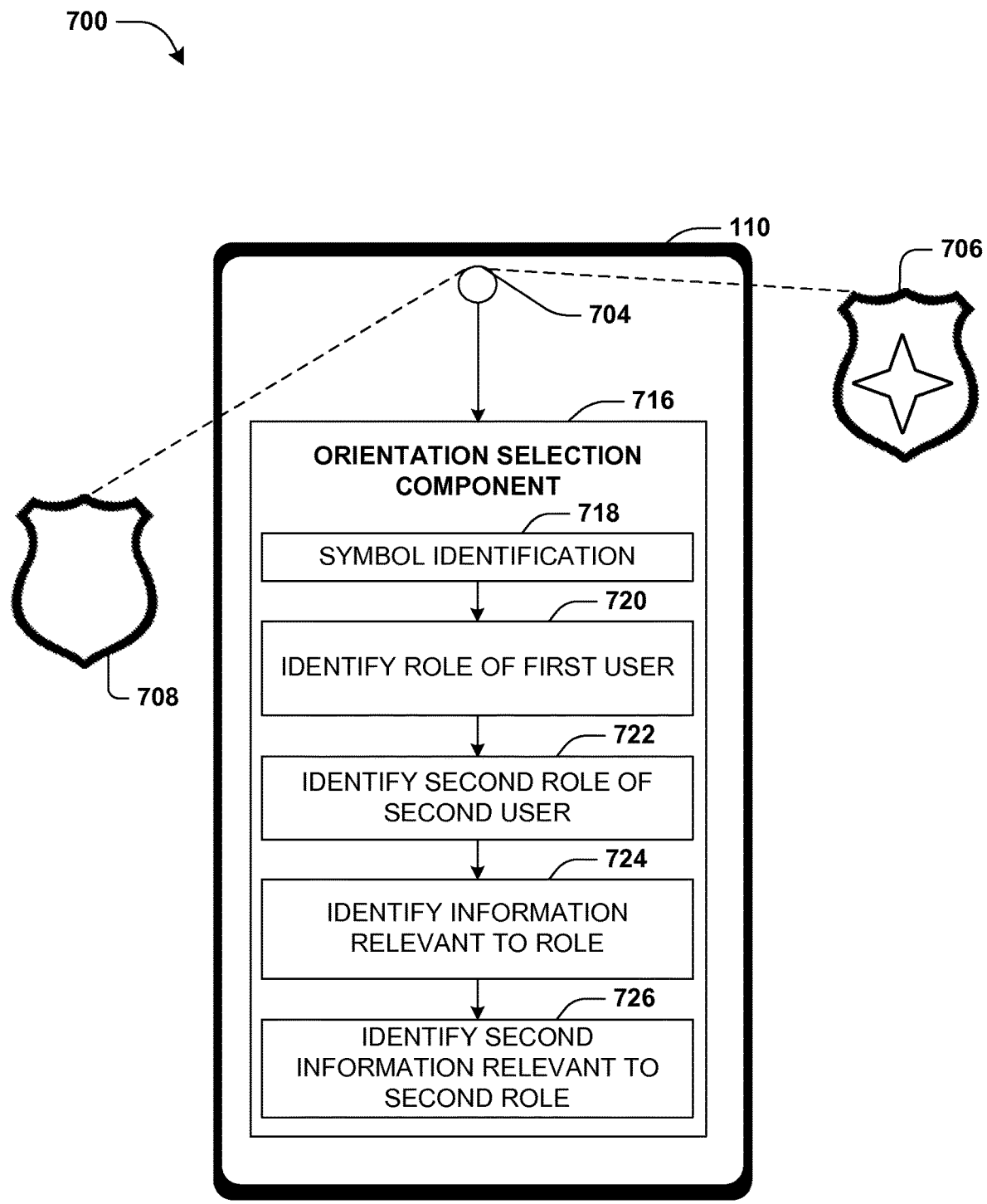
FIG. 7A is a component block diagram illustrating an example system for orientation selection, where a role of a first user and a second role of a second user are identified utilizing symbol recognition.
Figure 7B:
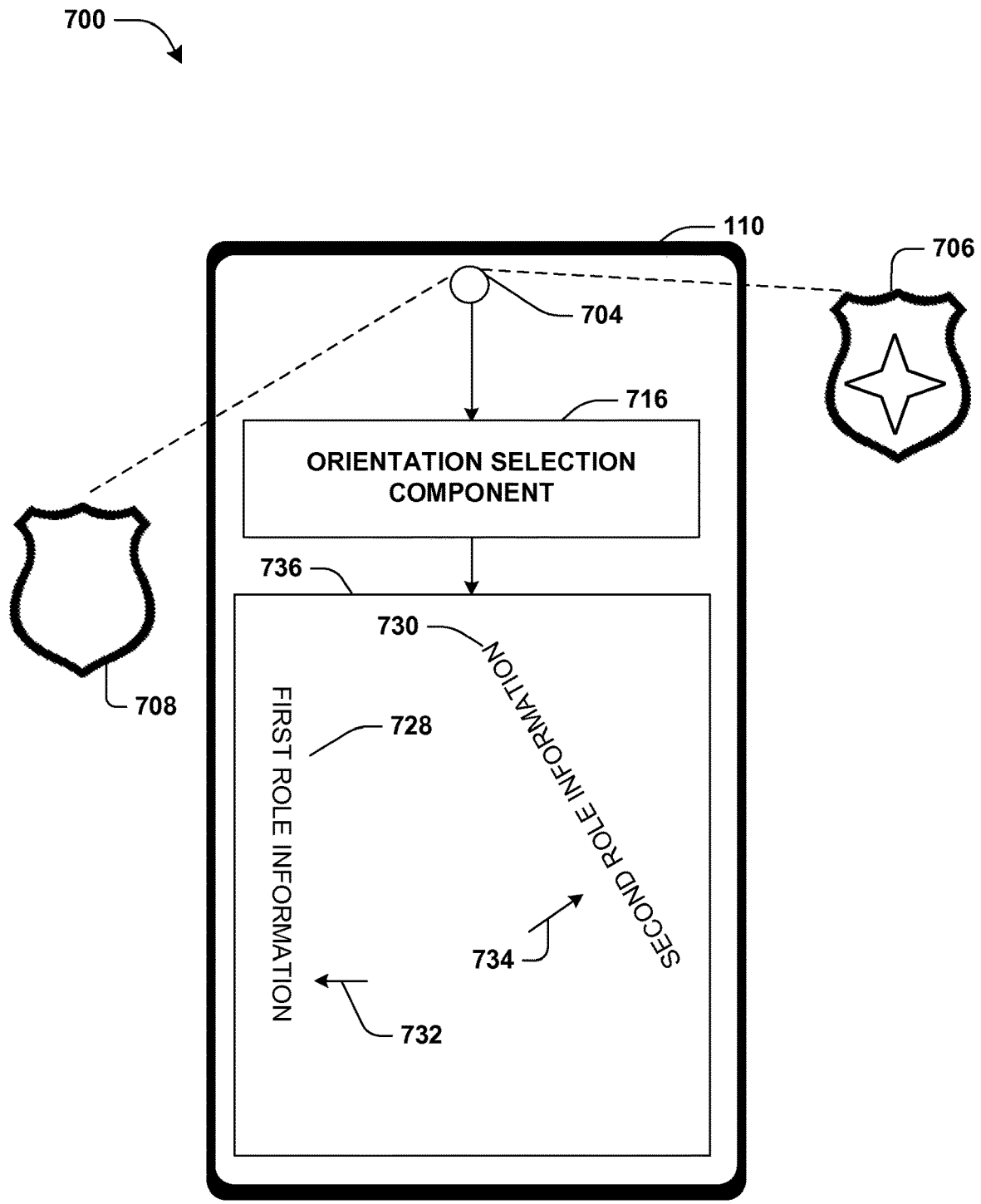
FIG. 7B is a component block diagram illustrating an example system for orientation selection, where first role information is presented in a first orientation to a first user of a client device and second role information is presented in a second orientation to a second user of the client device.

FIGS. 7A-7B illustrate an example system 700 for orientation selection comprising an orientation selection component 716. A first user (not shown), of a client device 110, associated with a symbol 708, may be detected by a detection component 704 of the client device 110. A second user (not shown), of the client device 110, associated with a second symbol 706, may be detected by the detection component 704. The orientation selection component 716 may identify a position of a face of the first user and a second position of a second face of the second user. A role of the first user may be identified based upon the symbol 708. A second role of the second user may be identified based upon the second symbol 706. The symbol 708 may be identified as a navigator's badge, and the second symbol 706 may be identified as a captain's badge. The orientation selection component 716 may identify information 724 relevant to a navigator and second information 726 relevant to a captain based upon the symbol 708 and the second symbol 706.

FIG. 7B illustrates the example system 700 presenting information of an application 736 of the client device based upon the symbol 708 and the second symbol 706. The orientation selection component 716 may present first role information 728, based upon the role of the first user (e.g., as the navigator), to the first user in the first orientation 732 based upon the position of the face of the first user. The orientation selection component 716 may present second role information 730, based upon the second role of the second user (e.g., as the captain), to the second user in a second orientation 734 based upon the second position of the second face of the second user.

Figure 8:
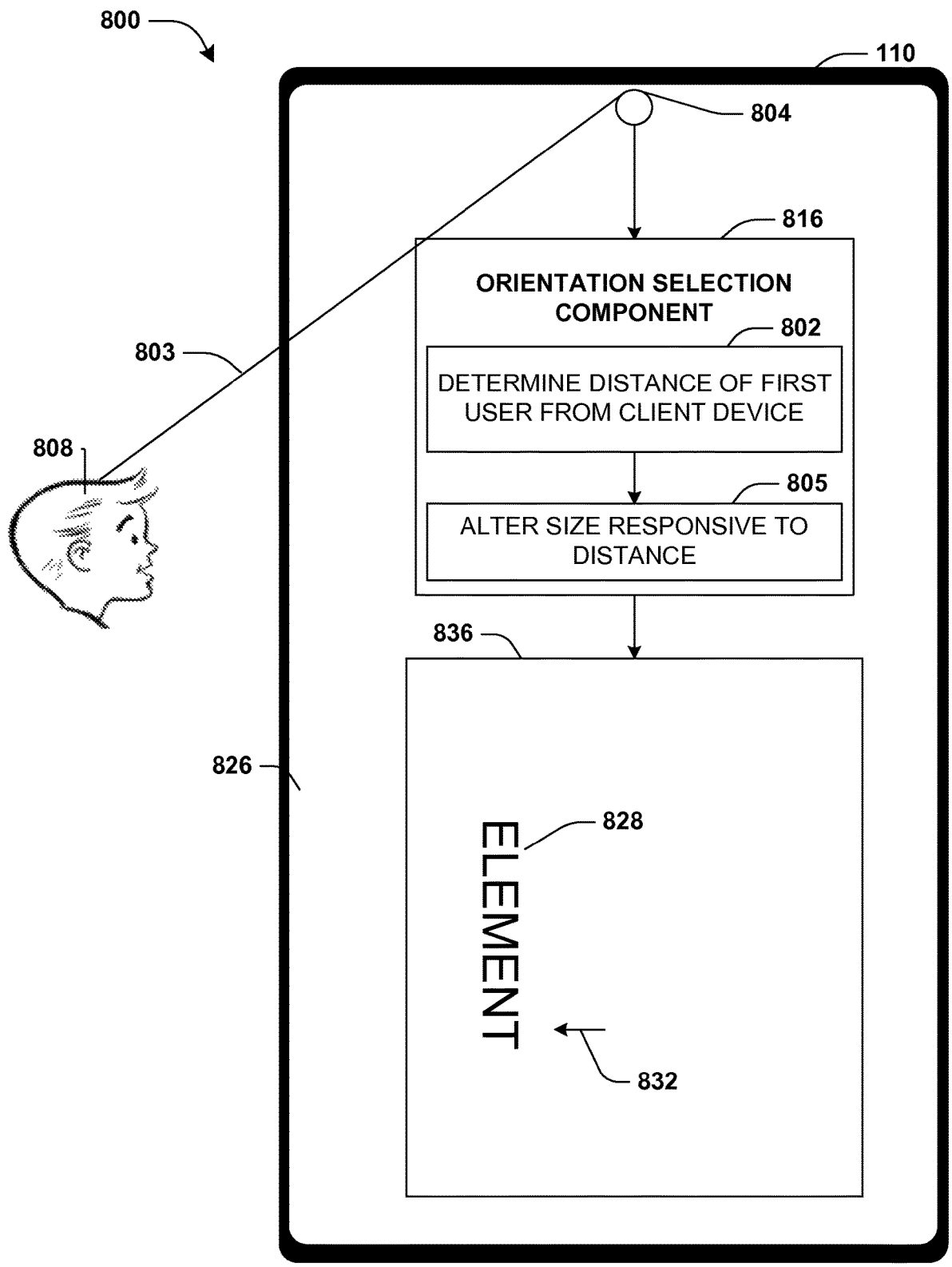
FIG. 8 is a component block diagram illustrating an example system for orientation selection, where a first element is presented in a first size in a first orientation to a first user of a client device based upon a distance of the first user from the client device.

FIG. 8 illustrates an example system 800 for orientation selection. An orientation selection component 816 may determine 802 a distance 803 of a first user 808 from a client device 110 utilizing a detection component 804. A position of a face of the first user 808 may be identified relative to a screen 826 of the client device 110. An element 828 of an application 836, displayed on the client device 110, may be displayed in a first orientation 832 based upon the position of the face. The element 828 may be displayed at a first size based upon the distance 803. In an example, if the first user moves away from the client device 110, increasing the distance 803, then the first size may be altered 805 to an increased size. In another example, if the user moves toward the client device 110, decreasing the distance 803, then the first size may be altered 805 to a decreased size.

Figure 9:
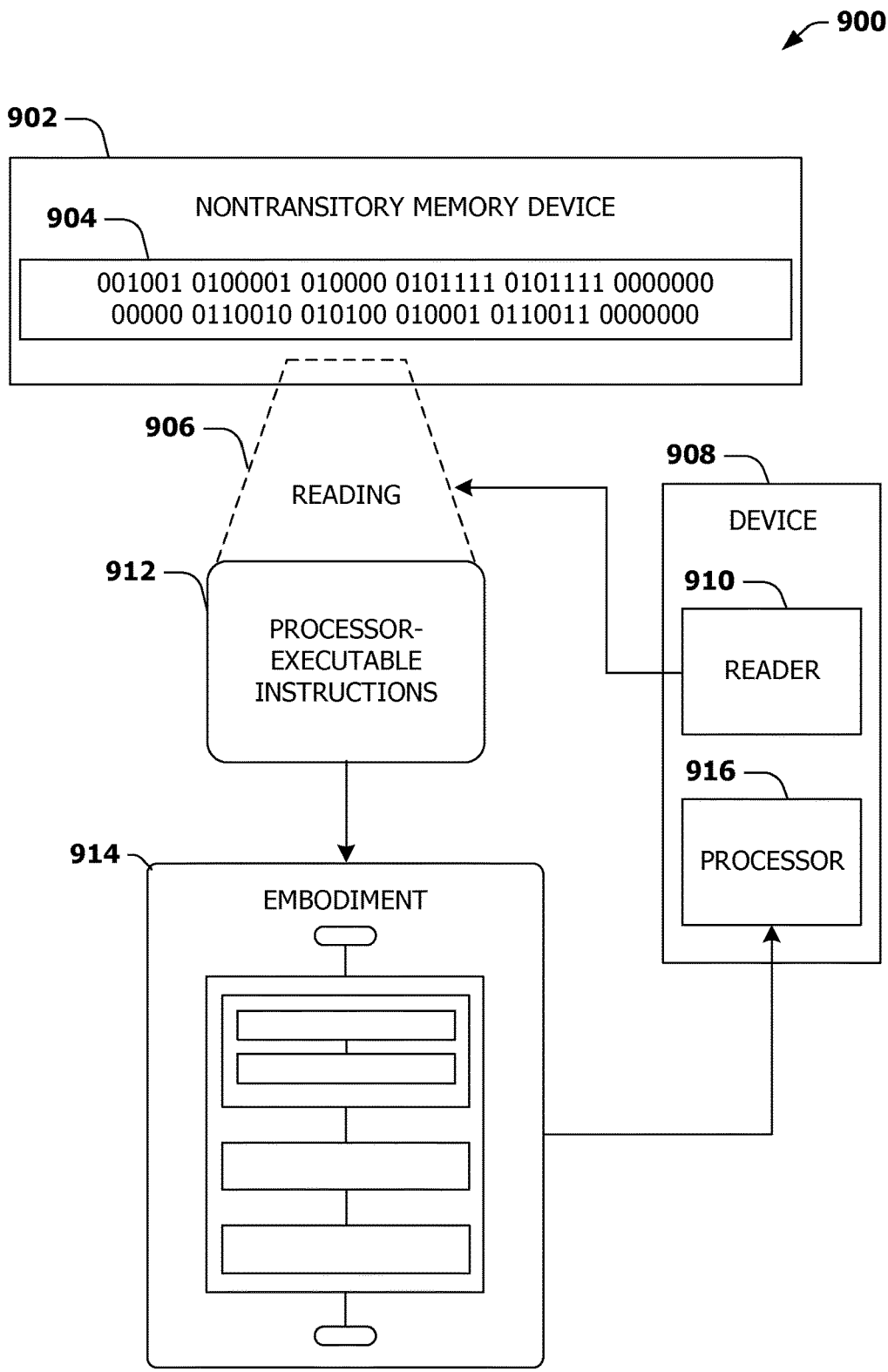
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example 400 of FIG. 4, for example. In some embodiments, the processor-executable instructions, when executed on the processor 916 of the device 908, are configured to implement a system, such as at least some of the example system 500 of FIG. 5, at least some of the example system 600 of FIGS. 6A-6C, at least some of the example system 700 of FIGS. 7A-7B, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of orientation selection, comprising:
    capturing a first image of a face of a first user;
    providing a first registration interface associated with an option to register the first user using the first image, wherein the first registration interface comprises one or more fields defining an identity of the first user;
    receiving, via the first registration interface, an indication that the first user has a first unique name;
    registering the first user in association with the first image and the first unique name;
    capturing a second image of a second face of a second user;
    providing a second registration interface associated with an option to register the second user using the second image, wherein the second registration interface comprises one or more fields defining a second identity of the second user;
    receiving, via the second registration interface, an indication that the second user has a second unique name;

registering the second user in association with the second image and the second unique name;
identifying a plurality of users engaging with a client device by monitoring a range of a detection component of the client device, the identifying comprising:
  detecting the first user within the range of the detection component; and
  detecting the second user within the range of the detection component;
responsive to detecting the first user:
  identifying a position of the face of the first user relative to a screen of the client device;
  analyzing the face of the first user using facial recognition;
  identifying the identity of the first user, comprising the first unique name of the first user, based upon the analyzing the face of the first user;
  identifying a first blog of the first user based upon the identity of the first user; and
  obtaining first information for the first user from the first blog of the first user;
responsive to detecting the second user:
  identifying a second position of the second face of the second user relative to the screen;
  analyzing the second face of the second user using facial recognition;
  identifying the second identity of the second user, comprising the second unique name of the second user, based upon the analyzing the second face of the second user, wherein the second identity of the second user is different than the identity of the first user;
  identifying a second blog of the second user based upon the second identity of the second user; and
  obtaining second information for the second user from the second blog of the second user; and
concurrently displaying on the client device:
  an element of an application in a first orientation based upon the position of the face, wherein the element comprises the first information; and
  a second element of the application in a second orientation based upon the second position of the second face, wherein the second element comprises the second information, wherein the first orientation is different than the second orientation.

2. The method of claim 1, wherein:
the identifying the identity of the first user comprises identifying the first unique name of the first user from first social media based upon the analyzing the face of the first user; and
the identifying the second identity of the second user comprises identifying the second unique name of the second user from second social media based upon the analyzing the second face of the second user.

3. The method of claim 1, comprising:
receiving an input corresponding to the identity of the first user; and
receiving a second input corresponding to the second identity of the second user.

4. The method of claim 1, wherein the first blog of the first user is different than the second blog of the second user.

5. The method of claim 1, comprising:
identifying a role of the first user utilizing a symbol associated with the first user;
identifying a second role of the second user utilizing a second symbol associated with the second user;
presenting third information in the first orientation based upon the role of the first user; and
presenting fourth information in the second orientation based upon the second role of the second user.

6. The method of claim 5, wherein the role of the first user comprises a first job, a first field, a first title, and a first specialty and the second role of the second user comprises a second job, a second field, a second title and a second specialty.

7. The method of claim 1, comprising:
identifying a distance of the first user from the client device; and
presenting the element in a first size based upon the distance.

8. The method of claim 1, comprising:
identifying a second distance of the second user from the client device; and
presenting the second element in a second size based upon the second distance.

9. The method of claim 1, comprising at least one of:
responsive to a light sensor, of the client device, detecting a light within a consistency range for a light duration threshold, deactivating the detection component; or
responsive to at least one of a motion sensor or a magnetic sensor, of the client device, detecting stability of the client device for a stability duration threshold, deactivating the detection component.

10. The method of claim 1, comprising:
facilitating collaborative interaction for two or more users, with the application on the client device, comprising presenting elements in orientations corresponding to positions of the two or more users.

11. The method of claim 1, comprising:
responsive to detecting a change in position of the face of the first user, at least one of reorienting, repositioning, or resizing the element.

12. A client device for orientation selection, the client device comprising:
a processor;
a display; and
a memory storing instructions that, when executed on the processor, provide a system comprising:
  an orientation selection component configured to:
    identify a plurality of users engaging with the client device by monitoring a range of a detection component of the client device, the identifying comprising:
      detect a first user within the range of the detection component; and
      detect a second user within the range of the detection component;
    responsive to detecting the first user:
      identify a position of a face of the first user relative to a screen of the client device;
      analyze the face of the first user using facial recognition;
      identify an identity of the first user, comprising a first unique name of the first user identified from first social media, based upon the analyzing the face of the first user; and
      obtain first information for the first user based upon the identity;
    responsive to detecting the second user:
      identify a second position of a second face of the second user relative to the screen;
      analyze the second face of the second user using facial recognition;

identify a second identity of the second user, comprising a second unique name of the second user identified from second social media, based upon the analyzing the second face of the second user, wherein the second identity of the second user is different than the identity of the first user; and obtain second information for the second user based upon the second identity; and concurrently display on the client device:

the first information, based upon the identity of the first user, in a first orientation based upon the position of the face; and the second information, based upon the second identity of the second user, in a second orientation based upon the second position of the second face, wherein the first orientation is different than the second orientation.

13. The client device of claim 12, wherein the orientation selection component is configured to:

identify a blog of the first user based upon the identity of the user, the first information retrieved from the blog of the first user; and identify a second blog of the second user based upon the second identity of the second user, the second information retrieved from the second blog of the second user.

14. The client device of claim 12, wherein the orientation selection component is configured to:

search one or more search websites for one or more unique names.

15. The client device of claim 12, wherein the orientation selection component is configured to:

identify a distance of the first user from the client device; and present an element comprising the first information in a first size based upon the distance.

16. The client device of claim 15, wherein the orientation selection component is configured to:

identify a second distance of the second user from the client device; and present a second element comprising the second information in a second size based upon the second distance, wherein the first size is different than the second size and the distance is different than the second distance.

17. The client device of claim 12, wherein the orientation selection component is configured to:

responsive to a light sensor, of the client device, detecting a light within a consistency range for a light duration threshold, deactivate the detection component; and responsive to the light sensor detecting the light outside the consistency range, reactivate the detection component.

18. The client device of claim 12, wherein the orientation selection component is configured to:

responsive to at least one of a motion sensor or a magnetic sensor, of the client device, detecting stability of the client device for a stability duration threshold, deactivate the detection component; and responsive to at least one of the motion sensor or the magnetic sensor detecting an instability of the client device, reactivate the detection component.

19. A non-transitory computer readable medium comprising instructions which when executed perform operations, comprising:

detecting a first user within a range of a detection component of a client device;

detecting a second user within the range of the detection component;

identifying a position of a face of the first user relative to a screen of the client device;

detecting a symbol associated with the first user within the range of the detection component;

identifying a role of the first user based upon the symbol associated with the first user;

obtaining first information for the first user, from a first user profile of the first user and a first blog of the first user, based upon the role of the first user;

identifying a second position of a second face of the second user relative to the screen;

detecting a second symbol associated with the second user within the range of the detection component;

identifying a second role of the second user based upon the second symbol associated with the second user;

obtaining second information for the second user, from a second user profile of the second user and a second blog of the second user, based upon the second role of the second user; and concurrently displaying on the client device:

the first information, selected for the first user, in a first orientation based upon the position of the face; and the second information, selected for the second user, in a second orientation based upon the second position of the second face, wherein the first orientation is different than the second orientation.

20. The non-transitory computer readable medium of claim 19, wherein at least one of the role or the second role comprises at least one of:

a job, a field, a title, or a specialty.

* * * * *